(12) United States Patent
Exnar et al.

(10) Patent No.: US 8,313,863 B2
(45) Date of Patent: Nov. 20, 2012

(54) SYNTHESIS OF NANOPARTICLES OF LITHIUM METAL PHOSPHATE POSITIVE MATERIAL FOR LITHIUM SECONDARY BATTERY

(75) Inventors: Ivan Exnar, Itingen (CH); Thierry Drezen, Cugy (CH)

(73) Assignee: Dow Global Technologies LLC, Midland, MI (US)

( * ) Notice: Subject to any disclaimer, the term of this patent is extended or adjusted under 35 U.S.C. 154(b) by 1016 days.

(21) Appl. No.: 12/296,204

(22) PCT Filed: Apr. 6, 2006

(86) PCT No.: PCT/IB2006/051061
§ 371 (c)(1),
(2), (4) Date: Dec. 8, 2008

(87) PCT Pub. No.: WO2007/113624
PCT Pub. Date: Oct. 11, 2007

(65) Prior Publication Data
US 2009/0186275 A1    Jul. 23, 2009

(51) Int. Cl.
*H01M 4/13* (2010.01)
(52) U.S. Cl. .............. 429/231.95; 429/218.1; 429/221; 429/231; 252/506; 423/306
(58) Field of Classification Search ............ 429/218.1, 429/221, 231.95; 423/306; 252/506
See application file for complete search history.

(56) References Cited

U.S. PATENT DOCUMENTS
2006/0035150 A1*  2/2006  Audemer et al. ............ 429/221
2008/0292522 A1*  11/2008 Kim et al. ................... 423/306

FOREIGN PATENT DOCUMENTS
WO   WO 2004001881 A2 * 12/2003

OTHER PUBLICATIONS

Kim et al., Polyol-mediated synthesis of Li4Ti5O12 nanoparticle and its electrochemical properties. Electrochem. Comm. 7 (2005) 1340-1344.*
Tajimi, S., et al., Solid State Ionics, 175 (2004) 287-290, Enhanced electrochemical performance of LiFePO4 prepared by hydrothermal reaction.
Kim, D.H., et al., Physica Scripta, T129 (2007) 31-34, A new method to synthesize olivine phosphate nanoparticles.
Ma, Jun, et al., Electrochemical performance of nanocrystalline LiMPO4 thin-films prepared by electrostatic spray deposition, Journal of Power Sources, vol. 148, 2005, pp. 66-71.
International Search Report for PCT/IB2006/051061, mailed Dec. 13, 2006.
Written Opinion of the International Searching Authority for PCT/IB2006/051061, mailed Dec. 13, 2006.

(Continued)

*Primary Examiner* — Barbara Gilliam
*Assistant Examiner* — Zachary Best

(57) ABSTRACT

Novel process for the preparation of finely divided, nano-structured, olivine lithium metal phosphates (LiMPO$_4$) (where metal M is iron, cobalt, manganese, nickel, vanadium, copper, titanium and mix of them) materials have been developed. This so called Polyol" method consists of heating of suited precursor materials in a multivalent, high-boiling point multivalent alcohol like glycols with the general formula HO—(—C$_2$H$_4$O—)$_n$—H where n=1-10 or HO—(—C$_3$H$_6$O—)$_n$—H where n=1-10, or other polyols with the general formula HOCH$_2$—(—C$_3$H$_5$OH—)$_n$—H where n=1-10, like for example the tridecane-1,4,7,10,13-pentaol. A novel method for implementing the resulting materials as cathode materials for Li.-ion batteries is also developed.

12 Claims, 3 Drawing Sheets

OTHER PUBLICATIONS

Yang, J. I. et al., "Nanaqueous sol-gel synthesis of high-performance LiFePO4", Electrochem Solid State Letters; Electrochemical and Solid-State Letters, vol. 7, No. 12, pp. A515-A518, (2004).

Tajimi S. et al., "Enhanced electrochemical performance of LiFePO4 prepared by hydrothermal reaction", Solid State Ionics, Diffusion & Reactions, vol. 175, No. 1-4, pp. 287-290, (Nov. 30, 2004).

Park K. S. et al., "Synthesis of LiFePO4 by co-precipitation and microwave heating", Electrochemistry Communications, vol. 5, No. 10, pp. 839-842, (Oct. 2003).

Feldmann, C. et al., "Preparation of sub-micrometer LnPO4 particles (Ln=La, Ce)", Journal of Materials Science, 37(15), pp. 3251-3254, (2002).

Kim, D. H. et al., "Polyol-mediated synthesis of Li4Ti5O12 nanoparticle and its electrochemical properties", Electrochem. Commun.; Electrochemistry Communications, vol. 7, No. 12, pp. 1340-1344, (Dec. 2005).

Larcher, D. et al., "Preparation of Metallic Powders and Alloys in Polyol Media: A Thermodynamic Approach", Journal of Solid State Chemistry, vol. 154, pp. 405-411, (2000).

Dong-Han, K. et al., "Synthesis of LiFePO4 nanoparticles in polyol medium and their electrochemical properties", Electrochemical and Solid-State Letters, Electrochem. Soc USA., vol. 9, No. 9, pp. A439-A442, (Sep. 2006).

Kim, T.R. et al., "Electrochemical and structural properties of lithium manganese phosphate prepared using polyol process", Abstract 209th ECS Meeting, 1 page, (May 7-12, 2006).

* cited by examiner

SYNTHESIS OF NANOPARTICLES OF LITHIUM METAL PHOSPHATE POSITIVE MATERIAL FOR LITHIUM SECONDARY BATTERY

This application is the U.S. national phase of International Application No. PCT/IB2006/051061, filed 6 Apr. 2006, which designated the U.S. the entire contents of which is hereby incorporated by reference.

FIELD OF THE INVENTION

The invention relates to a method for manufacturing nanoparticles of olivine phosphateLiMPO$_4$, where M is Mn, Fe, Co, Ni, V, Cu, Ti and mix of them. This method enables the production of a material with an olivine structure of excellent crystallinity and high purity. The method utilises a lower processing temperature than is required to produce similar materials via conventional methods.

BACKGROUND OF THE INVENTION

Insertion compounds are those that act as a solid host for the reversible insertion of guest atoms. Cathode materials that will reversibly intercalate lithium have been studied extensively in recent years for use as electrode materials in advanced high energy density batteries and they form the cornerstone of the emerging lithium-ion battery industry. Lithium-ion batteries have the greatest gravimetric (Wh/kg) and volumetric (Wh/L) energy densities of currently available conventional rechargeable systems (i.e., NiCd, NiMH, or lead acid batteries) and represent a preferred rechargeable power source for many consumer electronics applications. Additionally, lithium ion batteries operate around 3.6 volts enabling a single cell to operate in the correct voltage window for many consumer electronic applications.

Lithium ion batteries use two different insertion compounds: for the active cathode and for the anode materials. In a lithium-ion battery, lithium is extracted from the cathode material while lithium is concurrently inserted into the anode on charge of the battery. Lithium atoms travel, or "rock", from one electrode to the other in the form of ions dissolved in an electrolyte. The associated electrons travel in the circuit external to the battery. Layered rock-salt compounds such as LiCoO$_2$ and LiNiO$_2$ (1) are proven cathode materials. Nonetheless, Co and Ni compounds have economic and environmental problems that leave the door open for alternative materials. LiMn$_2$O$_4$ is a particularly attractive cathode material candidate because manganese is environmentally benign and significantly cheaper than cobalt and/or nickel. LiMn$_2$O$_4$ refers to a stoichiometric lithium manganese oxide with a spinel crystal structure. A spinel LiMn$_2$O$_4$ intercalation cathode is the subject of intense development work (2), although it is not without faults. The specific capacity obtained (120 mAh/g) is 15-30% lower than Li(Co,Ni)O$_2$ cathodes, and unmodified LiMn$_2$O$_4$ exhibits an unacceptably high capacity fade. Several researchers have stabilized this spinel by doping with metal or alkali cations (3,4). While the dopants successfully ameliorated the capacity decline, the initial reversible capacity is no better than 115 mAh/g, and the running voltage of the cell is no better than the usual 3.5 V.

Recently, olivine-structured LiMPO$_4$ where M=Fe, Mn, Co, Cu, V, Ni, have been gaining interest as candidate materials for rechargeable lithium batteries (5, 6, 7 & Goodenough patent). They have a theoretical capacity of up to 170 mAh/g, which would increase the energy density compared to LiCoO$_2$ or LiMn$_2$O$_4$ In particular Lithium iron phosphate (LiFePO$_4$) has established its position as a potential next generation cathode material. LiFePO$_4$ has advantages in terms of material cost, chemical stability and safety. However, the Fe$^{+3}$/Fe$^{+2}$ couple in LiFePO$_4$ has a significantly lower voltage (3.45V versus Li/Li$^+$) when compared to the (3.9 V versus Li/Li$^+$) in the standard LiCoO$_2$ based lithium ion batteries and this lowers the energy available for the LiFePO$_4$ system. In addition LiFePO$_4$ has low electronic conductivity which leads to initial capacity loss and poor rate capability associated with diffusion-controlled kinetics of the electrochemical process. Morphological modification at the nano-scale level appears to be the best tool to control these undesired phenomena.

The use of olivine type LiMnPO$_4$ would also be of interest because of the position of the Mn$^{+3}$/Mn$^{+2}$ couple which creates a potential of 4.05V versus Li/Li$^+$ which is compatible with the present LiCoO$_2$ based lithium ion batteries. However, LiMnPO$_4$ is an insulator with ca. 2 eV spin exchange band gap and this significantly lowers the electrochemical activity compared to LiFePO$_4$ which is a semiconductor with ca. 0.3 eV crystal field band gap. Furthermore the two-phase Mn$^{+3}$/Mn$^{+2}$ redox character also prohibits the introduction of mobile electrons or holes into the band. Synthesis of nanoparticles of LiMnPO$_4$ from metal alkoxides has been patented by our group (8). Also in this case, heating at 500° C. or higher temperature was necessary to prepare a pure crystallized LiMnPO$_4$, resulting in an undesirable particle growth. However, a small particle size is particularly attractive to achieve faster Li ion diffusion and hence higher rate capability in Li ion batteries.

In this regard, a new method to obtain nanoparticles has been conducted via a polyol process (9). Polyols are considered to exert reducing power at their relatively high boiling points and well defined nanoparticles are obtained (10). The polyol process has been well adopted to the preparation of divided powders of metals (11, 12) and binary alloys (13, 14). The polyol process consists of the reduction in a liquid alcoholic medium of metallic oxides, hydroxides, alkoxides and salts.

We intended to combine the polyol process to synthesize and reduce phospho-olivine compounds (LiMPO$_4$) into nanosized materials. This is the first report in using a polyol process to prepare a quaternary system (LiMPO$_4$).

SUMMARY OF THE INVENTION

The primary object of the invention is to obtain LiMnPO$_4$ of an excellent crystallinity and a high purity via a "chimie douce" reaction and low sintering temperatures. In order to achieve the above object, the invention is a method for manufacturing lithium metal phosphate (LiMPO$_4$) where M is Mn, Fe, Co, Ni, V, Cu . . . As such the primary object of the invention is to describe a synthetic preparation method. More particularly, the primary object of the present invention is to provide a "polyol" process route resulting in a pure well-crystallised phase of LiMPO$_4$.

According to an embodiment of the present invention, by covering surfaces of the particles of lithium metal phosphate (LiMPO$_4$) with a conductive agent such as acetylene black applied by high-energy milling, the electrochemical properties of the material as a positive electrode in Lithium ion battery are improved.

The third object of the invention is to describe an electrode preparation of the lithium metal phosphate/carbon composite. This process is very important to reach the correct electrochemical performances.

BRIEF DESCRIPTION OF THE DRAWINGS

The present invention will be described in detail with reference to the drawings showing the preferred embodiment of the present invention, wherein.

DETAILED DESCRIPTION OF THE INVENTION

Figure 1:
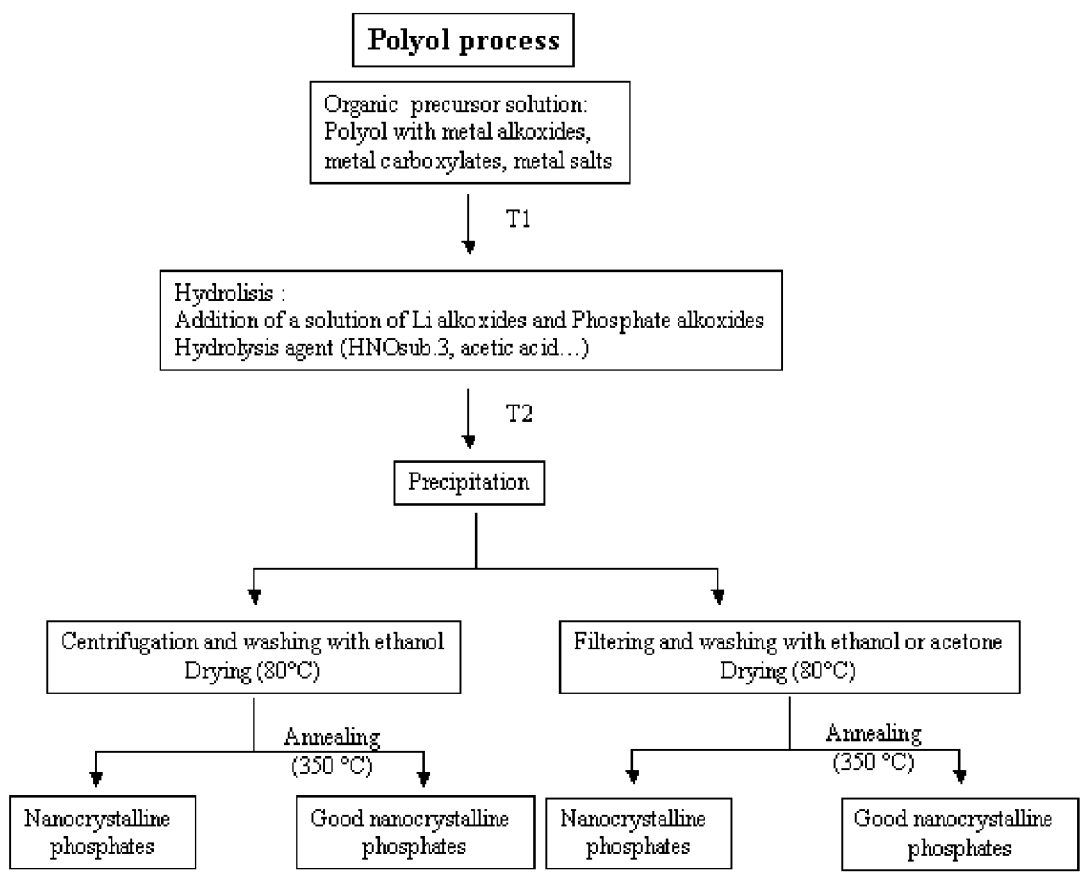
FIG. 1 shows the general flow chart for the preparation of the olivine Lithium Metal Phosphate ($LiMPO_4$) disclosed in the present invention.
Figure 2:
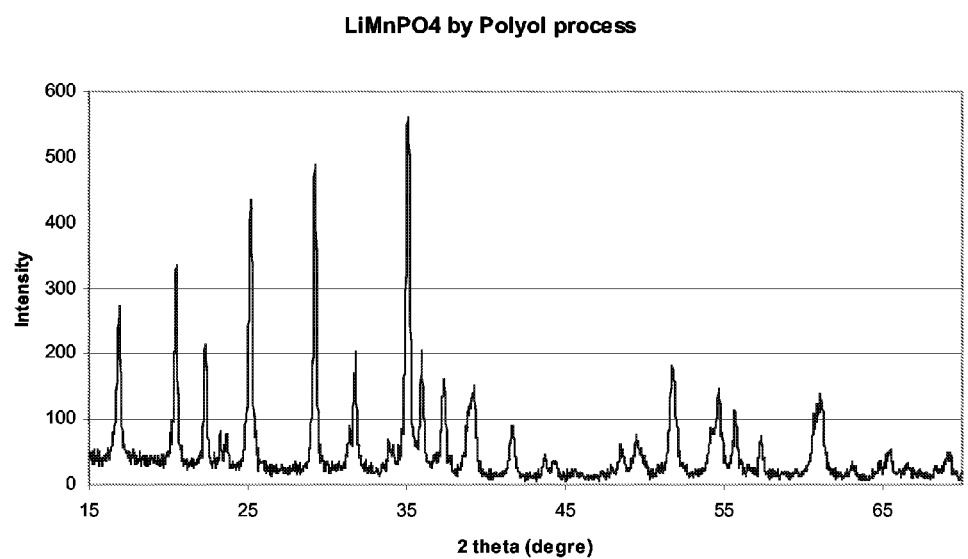
FIG. 2 shows X-ray diffraction pattern of the Lithiophilite Lithium Manganese Phosphate ($LiMnPO_4$) disclosed in the present invention.
Figure 3:
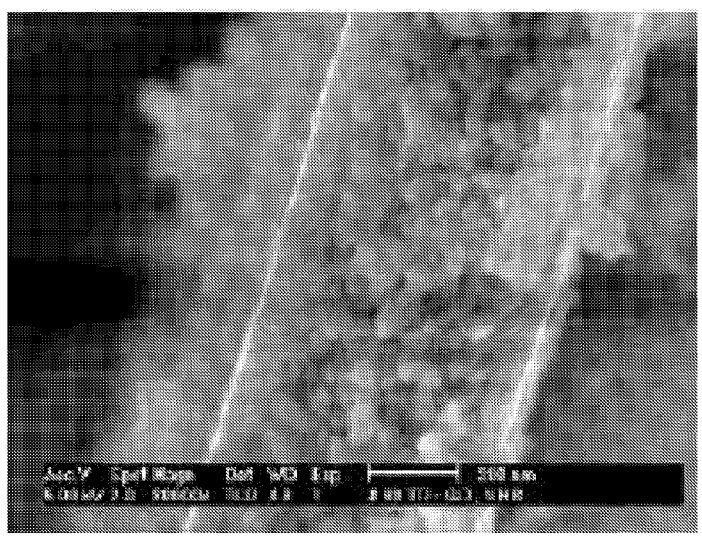
FIG. 3 shows the SEM pictures of a $LiMnPO_4$ prepared by a "polyol" process.
Figure 4:
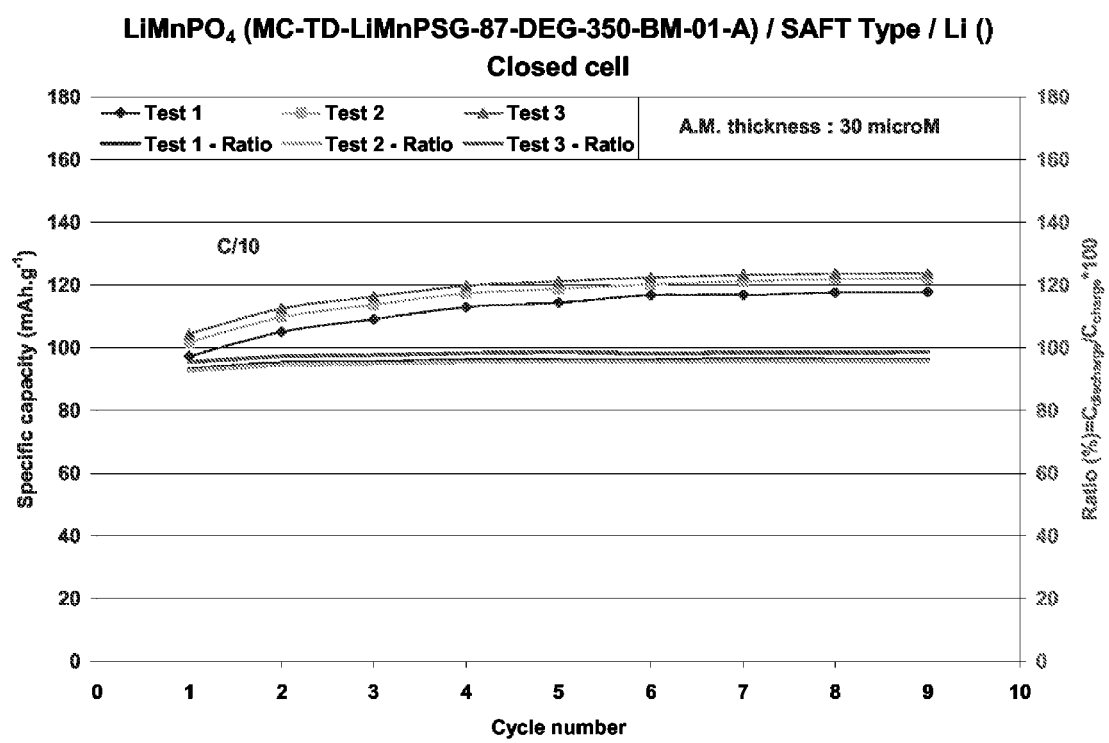
FIG. 4 shows specific capacity during discharge for $LiMnPO_4$ prepared by "polyol" process at C/10 rates.

Hereinafter, a method for manufacturing lithium metal phosphate (where metal is manganese, iron, cobalt, copper, nickel, vanadium, titanium and mix of them) according to the invention and a method for manufacturing a positive electrode active material will be described.

A. Method for Manufacturing $LiMPO_4$

Firstly, a method for manufacturing $LiMPO_4$ according to the invention will be described. The present invention discloses a type of synthesis that turned out to be well-suited for the preparation of spherical oxide particles of 20-150 nm in size is so-called "polyol" method. The basis of this method is the precipitation of a solid while heating sufficient precursors in a multivalent alcohol with a high-boiling point like glycols with the general formula $HO—(—C_2H_4O—)_n—H$ where n=1-10 or $HO—(—C_3H_6O—)_nH$ where n=1-10, or other polyols with the general formula $HOCH_2—(—C_3H_5OH—)_n$, —H where n=1-10, like for example the tridecane-1,4,7,10,13-pentaol, wherein metal M is iron, manganese, cobalt, nickel, vanadium, copper, titanium or a mixture of those compounds.

The alcohol itself acts as a stabilizer, limiting particle growth and prohibiting agglomeration. The high boiling point of the alcohol means that temperature can be applied (>150° C.), that result in highly crystalline oxides.

The method for manufacturing $LiMPO_4$ according to the invention is a method of obtaining $LiMPO_4$ by carrying out the steps of dissolution, hydrolysis, drying and eventually calcination.

Hereinafter, the respective steps in the invention will be detailed.

1. Dissolution of Metal Precursor

The present invention discloses a "polyol" method to prepare lithium metal phosphates. Polyol-mediated preparation is carried out by dissolving a suited metal (Mn, Fe, Co, Cu, Ni, V . . . ) precursors (e.g. acetates, alcoholates, oxides, alkoxides) in a suited solvent (e.g. ethylene glycol, propylene glycol, diethylene glycol, tetraethylene glycol etc.)

According to this mechanism, the polyol acts first as a solvent for the starting inorganic precursors due to the rather dielectric constant of these organic media. In diethylene glycol for instance, salts such as manganese acetates, cobalt acetates, iron acetates hydrate are soluble to such an extent that a complete dissolution is observed as the first step of the reaction.

The molar ratio metal salts/polyol can be varied from 0.01 to 0.15. In some cases, a few cubic centimeters of an aqueous solution can be added to increase the solubility of the salts. The solution is heated from 100 to 150° C. (depending of the solvent) for 1 to 3 hours to complete the dissolution.

2. Hydrolysis Process

The polyol also acts as solvent with a chelating effect which avoids agglomeration of particles during the preparation. Stoichiometric amounts of suitable lithium salts (e.g. lithium acetate hydrate) and phosphate salts (e.g. ammonium dihydrogen phosphate) were dissolved in a minimum volume of water. The solution was added to the polyol media. The water acts as a hydrolysis agent. The emerging suspension was heated for several hours up to 170-200° C. under stirring. A dehydration occurred at high temperature.

In addition to water, an acid can also be used to hydrolyse the solution.

3. Drying Process

The solid material was separated from the suspension by centrifugation and washed twice with ethanol. The "as synthesized" sample was dried at 80° C. for one day under air. The material shows the correct olivine structure after this treatment. The specific surface area is about 30 to 70 $m^2/g$ (particles size is about 60 to 25 nm)

4. Thermal Treatment

To obtain a complete crystalline phase, the material can be heated at different temperatures (300-500° C.) from 30 minutes to 1 hour in air. The resulting powder was ground in a mortar and characterised by X-ray diffraction study. The specific surface area is approximately in the range 20 to 50 $m^2/g$ (particle size is approximately in the range 90 to 35 nm).

B. Method for Manufacturing a Positive Electrode Active Material

Next, a method for manufacturing a positive electrode active material according to the invention will be described. The method for manufacturing the positive electrode active material according to the invention is characterized by blending a conductive agent with the $LiMPO_4$ obtained according to the above method for manufacturing the $LiMPO_4$ and $LiMPO_4$ used in the invention, being obtained according to a manufacturing method described in the "A. Method for manufacturing $LiMPO_4$", is omitted from describing here.

Furthermore, the conductive agent used in the invention, as far as it can improve the electrical conductivity, is not particularly restricted. For instance, graphite or carbon black such as acetylene black can be cited.

The conductive agent is added in the range of 5 to 25 parts by weight, preferably in the range of 10 to 20 parts by weight to 100 parts by weight of $LiMPO_4$. When an amount of the conductive agent is less than necessary, the electrical conductivity may not be sufficiently improved, and, when it is more than necessary, since an amount of $LiMPO_4$ becomes relatively less, the performances as the positive electrode active material may be deteriorated. In the invention, a method of blending the $LiMPO_4$ and the conductive agent is not particularly restricted. However, for instance, the physical blending is preferable and the mechanical blending is particularly preferable. Specifically, a ball mill pulverizing method or the like can be cited. Furthermore, applications of the positive electrode active material obtained according to the invention are not particularly restricted. However, it can be used in, for instance, lithium secondary batteries.

The present invention discloses improved electrochemical performances of $LiMPO_4$/carbon composite. This composite was obtained by high energy milling of $LiMPO_4$ with acetylene black in a stainless steel container using a planetary ball mill for several hours.

The present invention also discloses electrode preparation of $LiMPO_4$/C composite to improve electrochemical performances. Electrode of $LiMPO_4$/C active material was prepared by mixing of the active material (composite) with a carbon black and a binder in N-methyl-2-pyrrolidinon. The slurry was then coated on an aluminium foil, serving as the current collector. The N-methyl-2-pyrrolidinon was subsequently evaporated in air on titanium hot plate.

EXAMPLES

Hereinafter, the invention will be more specifically described with reference to examples.

Example 1

Preparation of nanosized lithium manganese phosphate: To 100 mL of diethylene glycol, 20 mL of a solution of 1.5 mol./L of manganese (II) acetate tetrahydrate ($C_4H_6O_4Mn$ ($H_2O$)$_4$) was added. The mixture was heated at 140° C. for about 1 hour. A dark brown solution was obtained. 2 mL of concentrated acetic acid was added to the solution. 20 ml of a solution of 1.5 mol./L of lithium acetate dihydrate ($C_2H_3O_2Li$ ($H_2O$)$_2$) and ammonium di-hydrogen phosphate ($H_6NO_4P$) was added to the glycol solution. A brownish precipitate was formed. Under extreme agitation, the mixture was heated at 180° C. under reflux for 4 hours. To remove the diethylene glycol, the mixture was cooled down at room temperature, centrifuged and washed twice with ethanol. The precipitate was dried at 80° C. for 1 day. The material was then calcined at 350° C. for 1 hour under air.

X-ray pattern of this material indicates a pure crystallized phase of lithium manganese phosphate ($LiMnPO_4$). The particle sizes of the material were included in the range 90-20 nm.

Example 2

The powder of $LiMnPO_4$ was placed in a 250 mL stainless steel container and ball milled with a planetary ball mill using 9 stainless steel balls of 20 mm diameter for one hour. In addition, 20% in weight of acetylene black was added to the milled $LiMnPO_4$ and ball milled again for 3 hours. A composite of $LiMnPO_4$/C was then obtained.

Example 3

A positive electrode composition of $LiMnPO_4$/C active material was prepared by mixing of the active material (composite) with a carbon black (C55 from Shawinigan) and a binder (polyvinylidene difluoride—PVDF) with the mass ratio (90:5:5), in N-methyl-2-pyrrolidinon. The slurry was then coated on an aluminium foil, serving as the current collector. The N-methyl-2-pyrrolidinon was subsequently evaporated in air at 100° C. for 1 hour and 120° C. for 30 minutes on titanium hot plate. The electrode was then dry at 160° C. overnight under vacuum.

Example 4

The positive electrode of example 3 was tested in standard laboratory Swagelok test cells versus Li metal. Microporous Celgard membrane served as separator. The electrolyte was made of 1M of $LiPF_6$ dissolved in a 1:1:3 by volume mixture of dried and purified propylene carbonate (PC), ethylene carbonate (EC) and dimethyl carbonate (DMC).

The electrochemical properties of $LiMnPO_4$/C electrodes were measured using an Arbin BT 2000 electrochemical measurement system by galvanostatic charge/discharge and cyclic voltammetry.

The battery prepared above was charged under a current density of 0.03 mA/cm$^2$ until a termination voltage of 4.7 volt was reached. Then the charged battery was discharged at a current density of 0.03 mA/cm$^2$ until a termination voltage of 2.3 volt was reached.

Example 5

Preparation of nanosized lithium cobalt phosphate: To 100 mL of diethylene glycol, 20 mL of a solution of 1.5 mol./L of cobalt (II) acetate tetrahydrate ($C_4H_6O_4Co$ ($H_2O$)$_4$) was added. The mixture was heated at 140° C. for about 1 hour. A dark solution was obtained. 20 ml of a solution of 1.5 mol./L of lithium acetate dihydrate ($C_2H_3O_2Li(H_2O)_2$) and ammonium di-hydrogen phosphate ($H_6NO_4P$) was added to the glycol solution. A precipitate was formed. Under extreme agitation the mixture was heated at 180° C. under reflux for 4 hours. The mixture was cooled down at room temperature. The mixture was then centrifuged and washed twice with ethanol to remove the diethylene glycol. The precipitate was dried at 80° C. for 1 day. The material was then calcined at 350° C. for 1 hour under air.

X-ray pattern of this material indicates a pure phase of lithium cobalt phosphate ($LiCoPO_4$). The particle sizes of the material were included in the range 90-20 nm Example 6

Preparation of nanosized lithium iron phosphate: To 100 mL of diethylene glycol, 20 mL of a solution of 1.5 mol./L of Iron (II) acetate ($C_4H_6O_4Fe$) was added. The mixture was heated at 140° C. for about 1 hour. A dark solution was obtained. 20 ml of a solution of 1.5 mol./L of lithium acetate dihydrate ($C_2H_3O_2Li(H_2O)_2$) and ammonium di-hydrogen phosphate ($H_6NO_4P$) was added to the glycol solution. A brownish precipitate was formed. Under agitation the mixture was heated at 180° C. under reflux for 4 hours and cooled down to room temperature. The mixture was then centrifuged and washed twice with ethanol to remove the diethylene glycol. The precipitate was dried at 80° C. for 1 day. The material was then calcined at 350° C. for 1 hour under air.

X-ray pattern of this material indicates a pure phase of lithium iron phosphate ($LiFePO_4$). The particle sizes of the material were included in the range 90-20 nm.

Example 7

Preparation of nanosized lithium manganese phosphate: To 100 mL of diethylene glycol, 20 mL of a solution of 1.5 mol./L of manganese (II) acetate tetrahydrate ($C_4H_6O_4Mn$ ($H_2O$)$_4$) was added and 2 mL of concentrated acetic acid. The mixture was heated at 120° C. for about 1 hour. A dark brown solution was obtained. 20 ml of a solution of 1.5 mol./L of lithium acetate dihydrate ($C_2H_3O_2Li(H_2O)_2$) and ammonium di-hydrogen phosphate ($H_6NO_4P$) was added to the glycol solution. A brownish precipitate was formed. Under extreme agitation the mixture was heated at 160° C. under reflux for 5 hours and cooled down to room temperature. The mixture was then filtered and washed twice with acetone to remove the diethylene glycol. The powder was dried at 80° C. for 1 day. The material was then calcined at 500° C. for 1 hour under air.

X-ray pattern of this material indicates a pure crystallized phase of lithium manganese phosphate ($LiMnPO_4$). The particle sizes of the material were included in the range 90-40 nm.

Example 8

The synthesis of nanoparticles of $LiMnPO_4$ was performed according to those in Example 1 characterized in that the dried powder at 80° C. is already crystallised and no calcination step was applied. The particle sizes of the material were included in the range 50-20 nm Example 9

The synthesis of nanoparticles of $LiMnPO_4$ was performed according to those in Example 1 characterized in that the solvent is a multivalent alcohol with a high-boiling point like glycols with the general formula $HO-(-C_2H_4O-)_n-H$ where n=1-10 or $HO-(-C_3H_6O-)_n-H$ where n=1-10, or other polyols with the general formula $HOCH_2-(-C_3H_5OH-)_n-H$ where n=1-10, like for example the tridecane-1,4,7,10,13-pentaol.

REFERENCES

1. K. Mizushima, P. C. Jones, P. J. Wiseman, and J. B. Goodenough, Mat. Res. Bull., 15, 783 (1980).
2. M. M. Thackeray, Progress in Batteries and Battery Materials, Vol. 14, R. J. Brodd, ed., ITE Press, Inc., Brunswick, Ohio, p. 1 (1995), and references therein
3. Thackeray and Gummow, U.S. Pat. No. 5,316,877, 1994.
4. Zhong and Bondakdarpour, U.S. Pat. No. 5,631,104, 1997.
5. Padhi, A. K; Nanjudaswamy, K. S.; Goodenough, J. B. JES 1997, 144 (4) 1188
6. C Delacourt; P. Poizot; M. Morcrette; J.-M. Tarascon and C. Masquelier Chem. Mater. 2004, 16,93-99.
7. A. Yamada, S. C. Chung and K. Hinokuma, JES 148, A224 (2001)
8.1. Exnar, T. Drezen, N. H. Kwon-Roth, M. Isono, PCT/IB2006/050483.
9. M. Figlarz, F. Fievet and J. P. Lagier, FR pat. 8551483, 1985; Eur. Pat. 0113281, 1987; U.S. Pat. No. 4,539,041, 1985; Fin. Pat. 74416, 1988; Jpn. Pat. Appl 24303738, 1992.
10. L. Qiu, V. G. Pol, J. C. Moreno and A. Gedanken, Ultrason. Sonochem. 12 (2005) 243.
11. F. Bonets, G. Guery, D. Guyomard, R. Herrera Urbina, K. Tekaia-Elhsissen and J. M. Tarascon, Solid State Ionics, 126, (1999), 337-348.
12. G. Viau, F. Fievet-vincent and F. Fievet, J. Mater. Chem., 6 (6), (1996), 1047-1053.
13. G. Viau, F. Fievet-vincent and F. Fievet, Solid State Ionics, 84, (1996), 259-270.
14. C. Feldmann and H. O. Jungk, Angew. Chem. Int. Ed., 40 (2), (2001), 359-362.

The invention claimed is:

1. A process for the production of nanostructured olivine lithium metal phosphate particles comprising
    (a) dissolving a metal salt in a multivalent alcohol solvent having a high-boiling point wherein the metal of the metal salt is iron, manganese, cobalt, nickel, vanadium, copper, titanium or a mixture thereof and the dissolving in said solvent is at a first temperature to form a solution with said metal salt dissolved in the solvent,
    (b) subsequently adding a lithium salt, a phosphate salt, water and optionally a hydrolyzing agent to the solution such that a precipitate is formed,
    (c) heating the solution and precipitate to a second temperature higher than the first temperature such that the solution is dehydrated and the precipitate is crystallized to form the nanostructured olivine lithium metal phosphate, and
    (d) separating the lithium metal phosphate from the solvent.

2. The process according to claim 1 wherein the nanostructured olivine lithium metal phosphate particles have a particle size in the range 20-100 nm.

3. The process according to claim 2 wherein the particle size is in the range 20-50 nm.

4. The Process according to claim 1 further comprising drying the precipitate separated from the solvent.

5. The process according to claim 1, wherein the solvent is a glycol.

6. The process according to claim 4, wherein the first temperature is 100 to 150° C.

7. The process according to claim 1, wherein the lithium salt and phosphate salt are dissolved first in distilled water and added as a solution in step (b).

8. The process according to claim 1, wherein the second temperature is 160 to 210° C.

9. The process according to claim 6, wherein the hydrolyzing agent is used for the hydrolysis of the polyol solution and hydrolyzing agent is an acidic solution.

10. The process according to claim 1, wherein the molar ratio of the metal salts to multivalent alcohol is 0.01 to 0.15.

11. The process according to claim 4, wherein the precipitate is dried at 80° C. for 24 h.

12. The process according to claim 4 further comprising calcining the dried powder at 350-500° C. for 30 minutes to 1 hour.

* * * * *